United States Patent [19]

Takahashi et al.

[11] Patent Number: 4,618,639
[45] Date of Patent: Oct. 21, 1986

[54] ANTISTATIC ORGANOPOLYSILOXANE COMPOSITION

[75] Inventors: Masaharu Takahashi; Motoo Fukushima, both of Gunma, Japan

[73] Assignee: Shin-Etsu Chemical Co., Ltd., Tokyo, Japan

[21] Appl. No.: 755,424

[22] Filed: Jul. 16, 1985

[30] Foreign Application Priority Data

Jul. 19, 1984 [JP] Japan .................... 59-150278

[51] Int. Cl.$^4$ .................... C08K 5/24
[52] U.S. Cl. .................... 524/262; 524/588; 524/730; 524/731; 524/860; 524/912; 528/24; 528/33; 528/34; 528/901
[58] Field of Search ............... 524/912, 262, 588, 730, 524/731, 860; 528/24, 33, 34, 901

[56] References Cited

U.S. PATENT DOCUMENTS

| | | | |
|---|---|---|---|
| 3,296,161 | 1/1967 | Kulpa | 524/34 |
| 4,039,503 | 8/1977 | Itoh | 524/262 |
| 4,144,206 | 3/1979 | Symeon | 524/912 |
| 4,153,752 | 5/1979 | MacKenzie, Jr. et al. | 524/262 |

Primary Examiner—Melvyn I. Marquis
Attorney, Agent, or Firm—Toren, McGeady, Stanger, Goldberg & Kiel

[57] ABSTRACT

The organopolysiloxane composition of the invention gives a cured silicone rubber article which is remarkably insusceptible to the accumulation of static electricity even in a prolonged service at an elevated temperature without sacrifice in respect of the performance of the permanent compression set. The inventive organopolysiloxane composition comprises, in addition to conventional components in silicone rubber compounds, an organosilicon compound, e.g. organopolysiloxane, having at least one ω-cyano-substituted n-alkyl group in a molecule in a specified amount.

1 Claim, No Drawings

ANTISTATIC ORGANOPOLYSILOXANE COMPOSITION

BACKGROUND OF THE INVENTION

The present invention relates to an antistatic organopolysiloxane composition or, more particularly, to an organopolysiloxane composition capable of giving a cured silicone rubber which is outstandingly free from the problem of accumulation of static electricity over a long period of time even at a relatively high temperature.

Needless to say, the problem of static electricity accumulated on fibers, plastics, rubbers and the like polymeric materials presents a very serious drawback in a variety of fields not only in respect of attraction of dusts and danger of possible explosion due to the spark discharge of the accumulated electricity but also in respect of the possible error in precision electronic instruments due to the strong electric fields around the charged surface. Accordingly, various attempts and proposals have been made to reduce accumulation of static electricity in the industries in which these materials are involved.

For example, various kinds of antistatic agents are proposed which are used either by being incorporated into the polymeric material before it is shaped into the form of fibers or plastic or rubber articles or by being applied on to the surface thereof. Compounds useful as such antistatic agents of internal and external uses include anionic ones, e.g. salts of carboxylic acids and phosphoric acid derivatives, cationic ones, e.g. amines and quaternary ammonium salts, and non-ionic ones, e.g. polyhydric alcohols.

These conventional antistatic agents are indeed effective in so far as the polymeric materials incorporated or coated therewith are used at room temperature or therearound. However, when the temperature is high at 150° to 300° C., for example, the antistatic performance of these antistatic agents is rapidly lost within a relatively short time. When the polymeric material into which these antistatic agents are incorporated is a silicone rubber, moreover, the antistatic agent is very detrimental to the properties of the cured silicone rubber article, in particular, in respect of the increase in the permanent compression set. The effect of the external application of an antistatic agent is rather temporary even at room temperature.

Despite the above mentioned problem, it is conventional that a silicone rubber compound is formulated with an antistatic agent as mentioned above in certain applications. For example, most of the fixing rollers in dry-process photocopying machines are made of a silicone rubber in view of the excellent heat resistance of silicone rubbers in comparison with other organic rubbers while the high electric insulation of a silicone rubber having a volume resistivity of, for example, $10^{14}$ ohm.cm or higher causes serious troubles due to the static electricity induced by the rubbing action between rollers that the paper fed to the roller sometimes winds around the roller or the toner particles are displaced from their correct positions in the course of fixing to cause blur of the photocopied images. Therefore, it is almost indispensable to incorporate an antistatic agent into silicone rubber compounds used for fabrication of fixing rollers of photocopying machines while the antistatic effect is rapidly lost at an elevated temperature of, for example, 180° to 230° C. to which the fixing rollers are not rarely heated when the photocopying machine is run continuously.

SUMMARY OF THE INVENTION

It is therefore an object of the present invention to provide a novel organopolysiloxane composition curable into a silicone rubber which is durably free from the problem of accumulation of static electricity even at elevated temperatures.

Another object of the invention is to provide a silicone rubber compound in which a specific antistatic component is incorporated and which is curable into a cured silicone rubber article having excellent properties, for example, in respect of the permanent compression set despite the above mentioned high antistatic performance thereof.

Thus, the antistatic organopolysiloxane composition of the invention comprises:

(a) 100 parts by weight of an organopolysiloxane represented by the average unit formula $$R_a SiO_{(4-a)/2}, \qquad (I)$$

in which R is a monovalent hydrocarbon group and the suffix a is a positive number in the range from 1.98 to 2.01;

(b) up to 500 parts by weight of a siliceous filler; and (c) from 2.5 to 25 parts by weight of an organosilicon compound having, in a molecule, at least one ω-cyano-substituted n-alkyl group of the formula $$\pm(CH_2)_n CN, \qquad (II)$$

in which the suffix n is a positive integer not exceeding 10 or, preferably, 3 bonded to the silicon atom, the amount being sufficient to give a weight proportion of the cyano groups in the range from 0.05 to 20% in the overall composition.

DETAILED DESCRIPTION OF THE PREFERRED EMBODIMENTS

The component (a) in the inventive composition is an organopolysiloxane represented by the above given average unit formula (I). The definition of the suffix a in the formula that a is a positive number of 1.98 to 2.01 means that the organopolysiloxane has a substantially linear molecular structure composed of th repeating diorganosiloxane units of the formula ($-SiR_2-O-$), in which R has the same meaning as defined above, although three-dimensional branches can be contained in a limited amount.

The symbol R in the formula (I) denotes a monovalent hydrocarbon group exemplified by alkyl groups, e.g. methyl, ethyl, propyl and butyl groups, alkenyl groups, e.g. vinyl and allyl groups, aryl groups, e.g. phenyl and tolyl groups, and cycloalkyl groups, e.g. cyclohexyl group. A part of the hydrogen atoms in these hydrocarbon groups may be replaced with certain substituents such as halogen, e.g. chlorine and fluorine, atoms to form, for example, chloromethyl and 3,3,3-trifluoropropyl groups.

The above mentioned definition of the component (a) is the same as that for an organopolysiloxane gum used as the base component in conventional silicone rubbers, in which preferably the organic groups denoted by R are mostly methyl groups as combined, according to need, with a relatively small number of vinyl and/or phenyl groups. The component (a) should preferably have a viscosity in the range from $1\times10^3$ to $20\times10^7$ centistokes at 25° C.

The component (b), which is an optional component in the inventive composition, is a siliceous filler which may be any one of conventional silica fillers formulated in silicone rubber compounds including fumed silica, precipitated silica, finely pulverized quartz and the like. When a reinforcing effect is desired of the silica filler, the filler should have a specific surface area of, preferably, at least 0.5 m²/g. Although the addition of the component (b) is optional and not essential in the inventive composition, it is desirable to add the component (b) in an amount of at least several parts by weight per 100 parts by weight of the component (a) from the standpoint of obtaining the effect of reinforcement to give a practically desirable strength to the cured rubber composition. A too much amount of the filler is of course undesirable due to the decrease in the workability of the inventive composition and the poor rubbery elasticity of the composition as cured. Accordingly, the amount of the component (b) should not exceed 500 parts by weight or, preferably be in the range from 5 to 100 parts by weight per 100 parts by weight of the component (a).

The component (c) is an organosilicon compound having, in a molecule, at least one ω-cyano-substituted n-alkyl group represented by the general formula (II) and bonded to the silicon atom. The group is preferably a 3-cyanopropyl group. The compound may be an organosilane or an organopolysiloxane having a linear molecular structure to exhibit an oily or gumlike consistency or highly branched molecular structure to exhibit a nature as a resin.

The organosilane compounds as the component (c) are represented by the general formula $$R^1{}_c[NC+(CH_2)_n]_dSiX_{4-c-d}, \quad (III)$$

in which $R^1$ is a monovalent hydrocarbon group selected from the class given as the examples of the group denoted by R, X is a monovalent atom or group such as a hydrogen atom, a halogen, e.g. chlorine or bromine, atom, unsubstituted or substituted amino group of the formula $-NR^2R^3$, $R^2$ and $R^3$ each being a hydrogen atom or an alkyl group having 1 to 4 carbon atoms, and alkoxy group having 1 to 4 carbon atoms, n is a positive integer not exceeding 10, c is zero, 1 or 2 and d is 1, 2 or 3 with the proviso that c+d is 1, 2 or 3.

Exemplary of the organosilane compounds in conformity with the above given definition are those expressed by the following structural formulas, in which the symbols Me, Et and Pr denote a methyl, ethyl and isopropyl groups, respectively:
(NC—C₃H₆)SiCl₃;
Me.(NC—C₃H₆)SiCl₂;
(NC—C₂H₄)Si(OEt)₃;
Me.(NC—C₃H₆)Si(OMe)₂;
Me.(NC—C₂H₄)Si(OPr)₂;
Me₂.(NC—C₃H₆)SiNMe₂; and
Me₂.(NC—C₃H₆)SiH.

A second class of the compounds suitable as the component (c) includes organopolysilazane compounds such as those expressed by the unit formulas of Me.(NC—C₃H₆)Si(NH)₂/₂ and (NC—C₃H₆)Si(NH)₃/₂.

Further, the component (c) is preferably an oily, gumlike or resinous organopolysiloxane represented by the average unit formula $$R^1{}_e\text{-}[NC+(CH_2)_n]_f\text{SiO}_{(4-e-f)/2},$$

in which $R^1$ and n each have the same meaning as defined above, e is zero or a positive number not exceeding 2 and f is a positive number of from 0.01 to 2 with the proviso that e+f is in the range from 0.01 to 2.01. When an oily organopolysiloxane is used as the component (c), the viscosity thereof should preferably be at least 10 centristokes at 25° C.

Exemplary of the organopolysiloxane mentioned above are those expressed by the following fomulas, denoting methyl, ethyl, propyl, vinyl and phenyl groups with Me, Et, Pr, Vi and Ph, respectively:

HO—SiMe₂—O—SiMe₂—O—SiVi—O—SiMe—OH;
　　　　　　　　　　　　|　　　|
　　　　　　　　　　　O—SiMe₃　C₃H₆—CN

Me+SiMe—O+ₙSiMe₂—C₃H₆—CN;
　　|
　　C₃H₆—CN

Me+SiMe—O+ₙSiMe₂—C₂H₄—CN;
　　|
　　C₂H₄—CN (NC—C₃H₆SiMeO)ₙ(Me₂SiO)ₘ;

(NC—C₂H₄SiMeO)ₙ(Me₂SiO)ₘ;

Me+SiEt—O+ₙSiMeEt—C₃H₆—CN;
　　|
　　C₃H₆—CN

Me+SiMe—O+ₙSiMe₂—C₂H₄—CN;
　　|
　　C₂H₄—CN (NC—C₃H₆SiMeO)ₚ(Me₂SiO)_q(MeViSiO)_r(Ph₂SiO)_s;

NC—C₃H₆—SiMe₂—O+SiMe₂—O+ₙSiMe₂—C₃H₆—CN;

NC—C₂H₄—SiMe₂—O+SiMe₂—O+ₙSiMe₂—C₂H₄—CN;

Vi+SiMe—O+ₙSiMePrVi;
　|
　C₃H₆—CN

HO+SiMe—O+ₙSiMePr—OH; and
　　|
　　C₃H₆—CN

HO+SiMe—O+ₙSiMePr—OH,
　　|
　　C₂H₄—CN in which n, m, p, q, r and s are each a positive integer. These ω-cyanoalkyl-containing organosilicon compounds can readily be prepared by a known synthetic method described in, for example, U.S. Pat. Nos. 2,564,674, 2,971,972, 3,531,508, 3,657,304 and 3,960,521 and Japanese Patent Publications Nos. 36-2039 and 39-17099.

The amount of the component (c) in the inventive organopolysiloxane composition should be determined in terms of the weight proportion of the component per se and the content of the cyano groups of the cyano-substituted alkyl groups in the component. The amount of the component (c) should preferably be such that the weight proportion of the component is in the range from 2.5 to 25 parts by weight per 100 parts by weight of the component (a) and the weight percentage of the cyano groups therein is in the range from 0.05 to 20% or, preferably, from 0.2 to 10% based on the overall amount of the composition. When the amount of the component (c) is too small, the desired effect of the antistatic performance at elevated temperatures of course cannot be obtained while an organopolysiloxane composition formulated with a too large amount of the component (c) is undesirable due to the increased stickiness of the composition to cause difficulties in processing if not to mention the increased costs of the composition by the unnecessary amount of the relatively expensive component (c) although the antistatic performance may further be improved at least to some extent.

The organopolysiloxane composition of the invention can be prepared by uniformly blending the components (a) and (c), optionally, together with the component (b) each in a specified amount. It is sometimes advantageous that the siliceous filler as the component (b) is first treated with the component (c) and the thus surface-treated filler is blended with the component (a), in particular, when the component (c) has a relatively high vaporizability. It is further optional that the inventive organopolysiloxane composition is admixed with various kinds of known additives conventionally used in silicone rubbers including anionic antistatic agents, e.g. derivatives of carboxylic and phosphoric acids, cationic antistatic agents, e.g. quaternary ammonium salts, non-ionic antistatic agents, e.g. polyhydric alcohols and polyethers, and electroconductive materials, e.g. conductive fillers and metal powders.

Curing or vulcanization of the inventive composition can be performed in the same manner as in the curing of conventional silicone rubbers. For example, the organopolysiloxane composition of the invention composed of the components (a), (c) and, optionally, (b) alone can of course be cured or vulcanized by the irradiation with actinic rays such as electron beams, gamma rays, ultraviolet light and the like. When a chemical means is preferred for curing, the composition should be further admixed with a curing agent or catalyst known in the art of silicone rubbers. For example, the composition can be thermally cured by heating with admixture of an organic peroxide as a curing agent such as dicumyl peroxide, di-tert-butyl peroxide, benzoyl peroxide, 2,4-dichlorobenzoyl peroxide, 2,5-dimethyl-2,5-di-tert-butyl peroxy hexane and the like. Curing by the mechanism of the hydrosilation is also applicable. The inventive composition can be shaped by any conventional shaping method including compression molding, calendering, extrusion molding and the like into a desired form which can be cured by a procedure depending of the type of the curing means or the curing agent.

In the following, the antistatic organopolysiloxane composition of the invention is described in more detail by way of examples, in which the expression of "parts" refers to "parts by weight" and the value of the viscosity is that obtained by the measurement at 25° C. in each occurrence.

EXAMPLE 1 AND COMPARATIVE EXAMPLES 1 AND 2

An organopolysiloxane composition of silicone rubber compound (Example 1) was prepared by uniformly blending 100 parts of a methylvinylpolysiloxane of a linear molecular structure having a viscosity of 5,000,000 centistokes and composed of 99.5% by moles of dimethylsiloxane units and 0.5% by moles of methylvinylsiloxane units, 50 parts of a fumed silica filler having a specific surface area of 200 m$^2$/g and 100 parts of a cyanoalkyl-containing organopolysiloxane of a linear molecular structure having a viscosity of 1,000,000 centistokes and composed of 13% by moles of 3-cyanopropyl methyl siloxane units and 87% by moles of dimethylsiloxane units together with 0.6 part of dicumyl peroxide. The silicone rubber compound was press-cured into a silicone rubber sheet of 2 mm thickness at 165° C. for 10 minutes and test pieces of each 40 mm by 40 mm wide were prepared by cutting the cured sheet. The thus cured sheet was subjected to the test of the permanent compression set by heating at 180° C. for 22 hours under compression to give the result shown in Table 1.

The static charging performance of these test pieces kept at an elevated temperature for a length of time was examined by measuring the half-life period using of a static honestometer under conditions of voltage impression of 10 kV and distance between the electrode and test piece of 20 mm to give the results tabulated in Table 1 below, from which it is clear that very durable antistatic performance can be obtained even at high temperatures.

For comparison, comparative silicone rubber compounds were prepared by uniformly blending 100 parts of the same methylvinylpolysiloxane as used in Example 1, 25 parts of the same fumed silica filler as used in Example 1 and 0.6 part of dicumyl peroxide with (Comparative Example 1) or without (Comparative Example 2) admixture of 2 parts of a fluorine-containing surface active agent (EFTOP 501, a product of Tohoku Hiryo Co.) and these silicone rubber compounds were fabricated into cured rubber sheets which were subjected to the tests of the permanent compression set and the antistatic performance in the same manner as in the silicone rubber sheet of Example 1 to give the results tabulated in Table 1.

TABLE 1

|  |  | Example 1 | Comparative Example 1 | Comparative Example 2 |
|---|---|---|---|---|
| Permanent compression set, % |  | 5 | 12 | 5 |
| Antistatic performance, half-life period | 200° C. for 4 hours | 0.7 second | 43 | more than 30 minutes |
|  | 220° C. for 1 day | 1.1 seconds | more than 30 minutes | more than 30 minutes |
|  | 220° C. for 4 days | 1.5 seconds | — | — |
|  | 220° C. for 7 days | 1.2 seconds | more than 30 minutes | more than 30 minutes |

EXAMPLE 2

A cured silicone rubber sheet of the rubber compound prepared in Example 1 was wound around an aluminum-made mandrel having a length of 320 mm and a diameter of 45 mm to give a back-up roller for a dry-process copying machine having a diameter of 50 mm.

This silicone rubber roller was coupled with a Teflon-coated fuser roller and the thus coupled rollers were used for the running test by continuously passing 100 sheets of B4 size copying paper under a load of 40 kg/320 mm between rollers at a fixing temperature of 190° to 200° C. The results were that no winding of the paper around the roller was noted at all.

EXAMPLE 3

A silicone rubber compound was prepared by uniformly blending 100 parts of the same methylvinylpolysiloxane as used in Example 1, 50 parts of the same fumed silica filler as used in Example 1 and 20 parts of 3-cyanopropyl triethoxysilane along with 0.6% by weight, based on the overall amount of the compound, of dicumyl peroxide. The silicone rubber compound was shaped and cured into a rubber sheet of which the tests of the permanent compression set and the antistatic performance were undertaken in just the same manner as in Example 1. The results were that the permanent compression set after 22 hours at 180° C. was 6% and the half-life periods of the static electric charge were 2 seconds after 4 hours at 200° C., 38 seconds after 2 days at 250° C. and 53 seconds after 4 days at 250° C.

EXAMPLE 4

A silicone rubber compound was prepared by uniformly blending 100 parts of the same methylvinylpolysiloxane as used in Example 1, 30 parts of a precipitated silica filler having a specific surface area of 320 m²/g and 10 parts by weight of a cyclic polysilazane compound, 1,3,5,7-tetramethyl-1,3,5,7-tetra(3-cyanopropyl) cyclotetrasilazane, along with 0.6% by weight, based on the overall amount of the compound, of dicumyl peroxide. The silicone rubber compound was shaped and cured into a rubber sheet of which the tests of the permanent compression set and the antistatic performance were undertaken in just the same manner as in Example 1. The results were that the permanent compression set after 22 hours at 180° C. was 5% and the half-life periods of the static electric charge were 0.2 seconds after 4 hours at 200° C., 0.5 second after 2 days at 250° C. and 0.9 second after 4 days at 250° C.

What is claimed is:

1. An antistatic organopolysiloxane composition which comprises
    (a) 100 parts by weight of an organopolysiloxane gum represented by the average unit formula $R_a SiO_{(4-a)/2}$, in which R is a monovalent hydrocarbon group and the subscript a is a positive number in the range from 1.98 to 2.01;
    (b) up to 500 parts by weight of a siliceous filler;
    (c) from 2.5 to 25 parts by weight of an organopolysiloxane represented by the average unit formula $R_c [NC-C_3H_6]_f SiO_{(4-e-f)/2}$, in which e is zero or a positive number not exceeding 2, c is zero, 1 or 2, and f is a positive number from 0.01 to 2 with the proviso that e+f is in the range from 0.01 to 2.01 and the weight percentage of the cyano groups is from 0.05 to 20%, component (c) having a viscosity of at least 10 centistokes at 25° C.; and
    (d) and organic peroxide.

* * * * *